United States Patent [19]

Inahashi

[11] 4,077,661

[45] Mar. 7, 1978

[54] CRANE HOOK APPARATUS

[75] Inventor: Kiichiro Inahashi, Yokohama, Japan

[73] Assignee: Kabushiki Kaisha Nippon Kijuki Seisakushio, Tokyo, Japan

[21] Appl. No.: 709,670

[22] Filed: Jul. 29, 1976

[30] Foreign Application Priority Data

Jul. 31, 1975 Japan .......................... 50-106024[U]

[51] Int. Cl.[2] .............................................. B64D 17/38

[52] U.S. Cl. .................................................. 294/83 R

[58] Field of Search ..................... 294/83 R, 75, 78 R, 294/82 R, 83 A, 83 AB; 24/230.5 CR, 230.5 S, 230.5 TH, 232, 233, 234, 235, 241 R, 241 P, 241 PP, 241 PS, 241 SP, 241, 513, 242

[56] References Cited

U.S. PATENT DOCUMENTS

| | | | |
|---|---|---|---|
| 2,872,237 | 2/1959 | Standifer, Jr. et al. | 294/83 R |
| 3,493,260 | 2/1970 | Smith | 294/83 R |
| 3,964,777 | 6/1976 | Lindquist | 294/83 R |

*Primary Examiner*—James B. Marbert
*Attorney, Agent, or Firm*—Holman & Stern

[57] ABSTRACT

A crane hook apparatus includes a hook which is rockably mounted on a rotatable stem member extending from a hanging body. A swingable locking device is pivotally mounted on the stem member, and normally assumes by gravity its operative position in which it substantially closes the opening of a recess in the hook. When located in its operative position, the locking device is movable toward its inoperative position inward into the recess, but is blocked from an outward movement. The locking device includes a portion which bears against the interior surface of the hook when it is moved to the inoperative position within the recess. The hanging body is provided with remotely controllable drive means which hauls a suspension member which extends through openings formed in alignment with the axis of the stem member for connection with the locking device. The drive means is operative to cause the suspension member to move the locking device to its inoperative position and then to cause the bearing portion to move the hook in a manner such that the recess opens in a horizontal direction. In this manner, the engagement or disengagement of the hook with or from a load is remotely controlled from a driver's cab.

4 Claims, 4 Drawing Figures

CRANE HOOK APPARATUS

FIELD AND BACKGROUND OF THE INVENTION

The invention relates to a crane hook apparatus, and more particularly, to such apparatus which permits a remote control of the engagement and disengagement of a hook with or from a load.

In the description to follow, containers, machines or suspension frameworks adapted to engage a hook apparatus of a crane will be inclusively referred to as "loads", and members thereon having openings or muzzles such as hooks, slings, bails, beams or the like will be inclusively referred to as "catches". The term "hook" or "hook apparatus" is intended herein to refer to an element or an apparatus associated with a crane and adapted for engagement with or disengagement from a catch on a load.

In the construction of conventional cranes, a crane driver does not participate in the operation of engaging or disengaging a hook from a catch on a load since he is located in a driver's cab which is at a distance from the location of the load. A hook is usually associated with a locking device which is designed to prevent an unintended fall of the load as it is being conveyed, and which is normally spring biased into it operative position in which it closes the opening of a recess in the hook. The locking device engages a stop which inhibits its movement toward the outside of the recess from the operative position, and therefore the locking device has to be retracted into its inoperative position inward of the recess before the hook can be engaged with or disengaged from a catch on a load. As a consequence, the known arrangement required the presence of operating personnel at the location where a load is being loaded or unloaded in order to perform the operation of engaging or disengaging the hook.

SUMMARY OF THE INVENTION

It is an object of the invention to provide a crane hook apparatus including a locking device which can be retracted to its inoperative position by a remote control from a driver's cab, followed by a movement of the locking device which causes a recess in a hook to open in the horizontal direction when it is desired to engage or disengage the hook with or from a catch on a load.

According to the invention, the above object is accomplished by providing a stem on a hanging body which has a rope pulley for engagement with a rope that extends from a winch. A hook and a locking device are both rockably mounted on the stem, and the locking device normally assumes by gravity its operative position in which a recess in the hook is substantially closed and in which it is freely movable inward of the recess, but is blocked from an outward movement. The locking device includes a portion which bears against the inside of the hook when it is retracted to its inoperative position. The hanging body is provided with remotely controllable drive means which hauls a suspension member which extends through an opening formed in the stem for connection with the locking device. The drive means initially moves the locking device to its inoperative position, and then causes the bearing portion to move the hook in a manner such that the recess opens in the horizontal direction.

The drive means employed in the invention may an electrically operated hydraulic force pump, which in turn may comprise a unitary combination of a pump directly connected with an electric motor and a hydraulic cylinder unit. The force pump may be replaced by an electromagnetic plunger unit or an electric winch.

With the hook apparatus of the invention, the recess in the hook may be made open in the horizontal direction, through a remote control from the driver's cab so that it is clear from the locking device for allowing the engagement or disengagement with or from a catch on a load when loading or unloading the crane.

DETAILED DESCRIPTION OF PREFERRED EMBODIMENT

Figure 1:
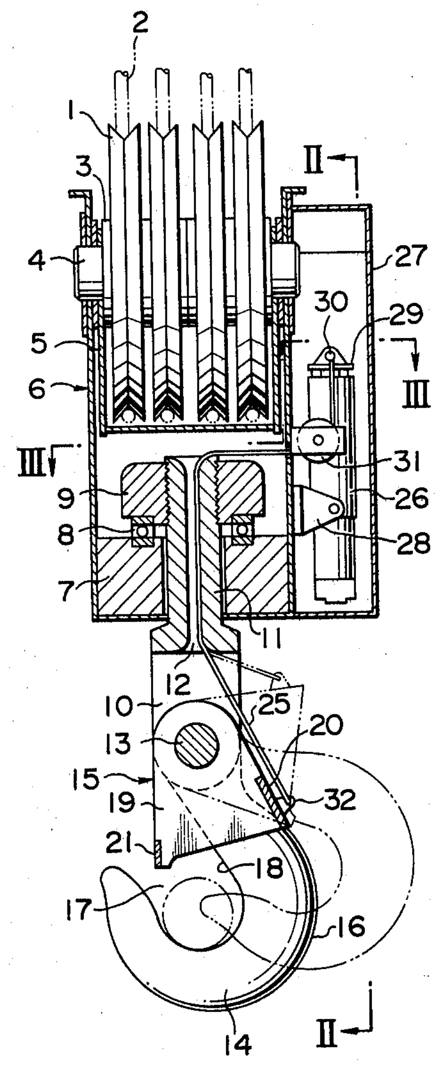
FIG. 1 is a side elevation, partly in section, of the hook apparatus according to the invention.

Referring to FIG. 1, the hook apparatus according to the invention includes a rope pulley 1 adapted to be engaged by a plurality of ropes 2 extending from the winch of a crane, not shown. The rope pulley 1 is rotatably mounted on a stationary shaft 4 through a bearing 3. The shaft 4 is mounted on a hanging body 6 together with a bearing box 5. The hanging body 6 is in the form of a rigid shell structure having on its bottom a spacer element 7, which carries a ball bearing 8 which in turn supports a nut member 9 adapted to threadably receive a stem 11. The stem extends through the spacer element 7 to a position below the hanging body 6, the lower end of the stem 11 being provided with a pair of limbs 10. The stem 11 is formed with an axial bore 12 which opens between the limbs 10, and is rotatable about the axis together with the nut 9.

Figure 4:
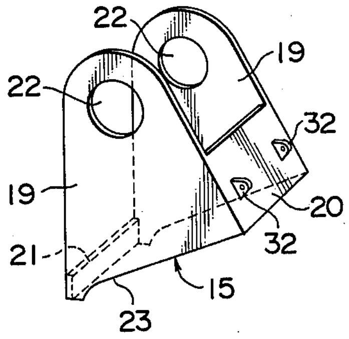
FIG. 4 is a perspective view of the locking device shown in FIG. 1.

A shaft 13 extends between and is secured to the both limbs 10 of the stem 11, and rockably carries a hook 14 as well as a locking device 15. The hook 14 is a single hook of known configuration, and includes an external convex surface 16 and a recess 17 formed by an internal concave surface 18. The locking device 15 is shown more fully in FIG. 4, and comprises a pair of sector-shaped brackets 19 and a pair of sideplates 20, 21 which join the brackets together. The brackets are formed with openings 22 which receive the shaft 13. The hook 14 is disposed between the both brackets 19, and normally hang down from the shaft 13 by gravity with one of the sideplates, 20 bearing against the external surface 16 and the other sideplate 21 and the lower edge 23 of the both brackets 19 assuming their operative position in which they substantially close the inlet opening of the recess 17. It will be noted from FIG. 1 that the locking device can not oscillate in the clockwise direction beyond this operative position. The term "substantially close" is intended to mean that once received within the recess 17 of the hook 14, a catch 24 on a load can not be disengaged therefrom by passing through the remaining clearance formed between the locking device 15 and the free end of the hook 14 when the device 15 is in its operative position.

Figure 2:
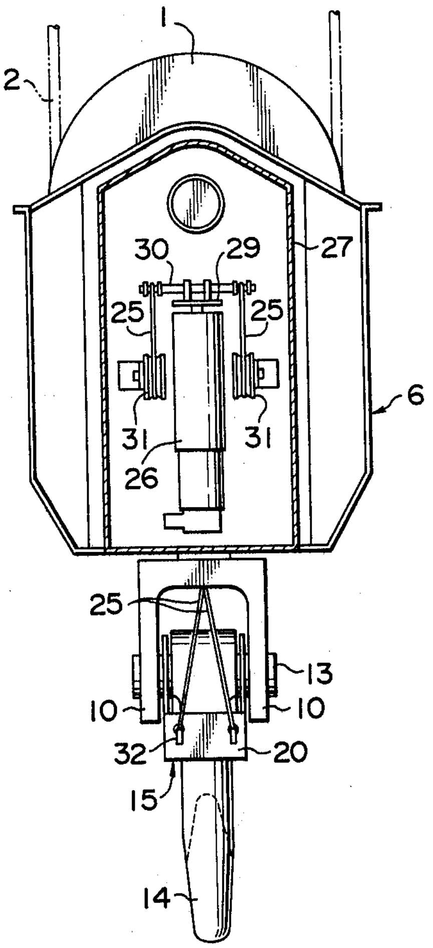
FIG. 2 is an end view taken on the line II—II of FIG. 1 and viewed in the direction of arrows.
Figure 3:
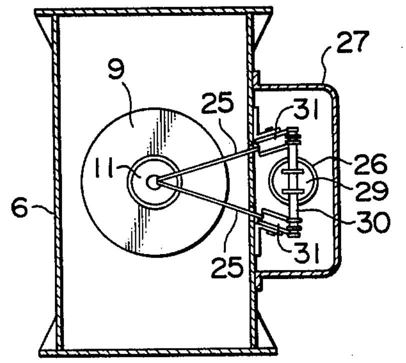
FIG. 3 is a cross section taken along the line III—III of FIG. 1.

It is a feature of the invention that when it is desired to engage or disengage the hook 14 with or from a load, the locking device 15 is retracted inward into the recess 17 or moved from its operative to its inoperative position, followed by a movement of the hook 14 in a manner such that the recess 17 opens in the horizontal direction. This operation is achieved by drive means 26 which operates through a suspension member 25 to turn the locking device 15 counter-clockwise as viewed in FIG. 1. In the example shown, the drive means 26 comprises an electrically operated hydraulic force pump of known form including a piston rod 29 which is mounted by support means 28 in a side housing 29 secured to one side of the hanging body 6. As will be evident from FIGS. 2 and 3, the suspension member 25 comprises a pair of ropes which extend from an anchoring rod 30 secured to the piston rod 29, around a pair of pulleys 31 located within the housing 27, thence into the hanging body 6 through suitable holes in the wall thereof, through the axial bore 12 in the stem 11, and then tied to a pair of fasteners 32 attached to the back side of the sideplate 20 of the locking device 15. The drive means 26 comprises an electric motor and a pump, and the arrangement is such that as the motor is driven, the pump builds up a hydraulic pressure which lifts the piston rod 29. Upon deenergization of the electric motor, the hydraulic pressure collapses, whereupon the piston rod 29 begins to fall down under the influence of gravity of its connected parts. However, the piston rod 29 can be maintained in its raised position during the energization of the motor. While a power supply cable and a signal cable for the motor are not shown, it will be appreciated that they can extend along the wire ropes which extend from the winch.

In operation, a crane driver in his cab operates a pushbutton, for example, to transmit an electric signal to the drive means 26 when the hook is to be engaged with or disengaged from a load. In response to the signal, the drive means 26 causes the suspension member 25 to be hauled, thereby moving the locking device 15 from the operative position in which it substantially closes the opening of the recess 17 to its inoperative position retracted into the recess 17. Thereupon the sideplate 21 bears against the internal surface 18 and subsequently carries the hook 14 therewith so as to turn it counter-clockwise about the shaft 13. This takes place regardless of the initial orientation of the hook 14 since the member 25 freely extends through the bore 12. The hauling action is continued until the opening of the recess 17 opens in the horizontal direction and is clear from the locking device 15. This position of the hook is maintained by continued energization of the drive means 26, and then the crane may be propelled in proper orientation and the elevation of the hook adjusted to engage the latter with a catch 24 on a load or to disengage it from the catch. When engaging the hook 14 with the catch 24, the drive means 26 is reset as soon as the catch is received into the recess 17, whereupon the hook resumes its lowermost position to firmly grip the catch 24 and the locking device 15 returns by gravity to its operative position closing the recess 17. Then the winch is operated to lift the hanging body 6.

Having described the invention, what is claimed is:

1. A crane hook apparatus comprising (a) a hanging body suspended by a rope from a winch, (b) a stem mounted on the hanging body and having an axial bore and a pair of downwardly depending limbs, (c) a shaft extending between and connected at its opposite ends to the pair of limbs, (d) a hook rockably mounted on the shaft and having an external convex surface and an internal concave surface which defines a recess therein, (e) a locking device rockably mounted on the shaft and normally assuming by gravity its operative position in which it substantially closes the opening of the recess, the locking device including a first portion operable in the operative position of the device to permit its inward movement to its inoperative position in which it clears the opening of the recess but to block its outward movement, thus halting the locking device, and also including a second portion which bears against the internal surface of the hook when it is moved to its inoperative position, (f) remotely controllable drive means carried by the hanging body for initially moving the locking device to its inoperative position, and subsequently moving the hook through the second portion in a manner such that the recess opens in the horizontal direction, and (g) a suspension member passing through the axial bore in the stem to connect the drive means and the locking device together.

2. A crane hook apparatus according to claim 1 in which the stem is rotatable about its axis.

3. A crane hook apparatus according to claim 1 in which the first portion of the locking device normally bears against the external surface of the hook.

4. A crane hook apparatus according to claim 1 in which the drive means comprises an electrically operated force pump.

* * * * *